United States Patent Office 3,123,559
Patented Mar. 3, 1964

3,123,559
INHIBITED DRILLING FLUID
Paul W. Fischer, Whittier, Calif., assignor to Union Oil Company of California, Los Angeles, Calif., a corporation of California
No Drawing. Filed Jan. 17, 1961, Ser. No. 83,169
11 Claims. (Cl. 252—8.5)

This invention relates to aqueous base drilling fluids and in particular relates to aqueous base drilling fluids which do not readily hydrate water swellable formations.

In the rotary drilling of subterranean oil wells, a drilling fluid is circulated down the drill string and up the annulus between the well bore and drill pipe. As this fluid passes out the lower end of the drill string it cools and lubricates the drill bit, removes cuttings therefrom, and carries them to the earth's surface. These cuttings are removed from the fluid at the surface and the fluid is treated and recirculated. During the drilling some of the drilling fluid seeps into the formation, depositing its suspended solids on the well bore wall in the form of a mud cake which seals the wall.

In some localities, particularly in the Gulf Coast area, formations are frequently encountered which contain easily hydratable clays and shales which swell and disintegrate upon contact with water. This is extremely troublesome because when contacted with water from the drilling fluid, the walls of the well bore often collapse and cave into the bore hole resulting in cavities and enlargements in the well bore which interfere with subsequent operations. Often the collapse of the shale causes the drill string to stick and sometimes makes further drilling impossible.

It has been suggested that various materials, such as sodium chloride, gypsum, lime, calcium chloride, etc., be incorporated in the drilling fluid to eliminate this difficulty, but while these materials are satisfactory in many instances, they are not entirely effective with respect to very readily hydratable formations such as are encountered in the Gulf Coast, Venezuela, Costa Rica, etc.

I have found that the hydration of swellable clays, heaving shale, etc., can be greatly reduced by adding to the drilling fluid a nonionic surface active agent obtained by the addition of the proper amounts of propylene, butylene or amylene oxide and ethylene oxide to ethylene diamine under conditions favoring ether polymerization to form polyoxyalkylene groups. This class of agent, its preparation and availability, is hereinafter described in detail.

Referring more particularly to the aqueous drilling fluids to which the invention applies, any of the commonly employed aqueous and water external emulsion base drilling fluids can be used. Conventionally, such fluids comprise fresh or salt water, clay, one or more fluid loss agents, and optionally, weighting materials and miscellaneous additives such as thinning agents, bactericides, etc. The water external emulsion base drilling fluids also contain between about 5 and 80 percent of a hydrocarbon oil dispersed in the water. The hydrocarbon oil can be a crude petroleum, a distillate, a residuum or a blend of virgin and cracked stocks. Usually such oil will have a gravity between about 12° and about 40° API and a viscosity between 30 SUS at 100° F. and 110 SSF at 122° F. Various oil-in-water emulsifiers can be employed to disperse the oil such as the rosin derivatives, e.g., Dressinate 90; polyalkylene polyamine emulsifiers; alkali metal soaps of fatty acids, etc. The selection and formulation of the oil and the oil-in-water emulsifier based on their chemical and physical properties is well understood by those skilled in the art.

Between about 10 to 250 pounds of clay per barrel of drilling fluid is employed to impart viscosity and thixotropicity to the water so that the cuttings can be suspended in the fluid while in the well bore, yet be separated from the fluid at the earth's surface. Various clays can be employed for this, e.g., local clay or commercially available clays such as bentonite, illites, beidellite, attapulgite, etc.

To prevent excessive water seepage and loss to the formation which would thereby render the drilling fluid unsuitable, between about 0.1 to 10 pounds of a fluid loss additive per barrel of drilling fluid is employed. The most common of such additives are sodium carboxymethyl cellulose, hydrolyzed polyacrylonitrile and starch. Other materials, such as the natural gums, e.g., arabic, tragacanth, karaya, locust bean, Egyptian gum, etc., can also be used.

Since densities greater than the normal aqueous clay suspension, e.g., densities greater than about 20 pounds per gallon, are sometimes needed, particularly when drilling relatively deep holes or where high formation pressures are encountered, it is common practice to employ weighting agents in amounts between about 10 to 1000 pounds per barrel of drilling fluid and sufficient to impart the desired density to the composition. Typical of the weighting agents which are used to obtain such densities are barites, iron oxide, calcium carbonate, celestite, tripoli, etc.

Because the clay often renders the water too viscous, or because the drilling fluid becomes excessively viscous upon use, various thinning agents in amounts between about 0.1 to 15 pounds per barrel are frequently employed to reduce its viscosity. Among such agents are tannin extracts such as chestnut extract, plant tannin, quebracho extract, etc.; lignins or humic acids; alkali and alkaline-earth lignosulfonates; and molecularly dehydrated phosphates are not preferred as thinning agents because of their tendency to precipitate calcium phosphates.

When the fluid comprises an organic material such as starch or humus, bactericides are frequently employed in minor amounts to prevent fermentation. Typical of such bactericides are: paraformaldehyde, lime and salt in high concentrations and limited amounts of quaternary salts.

As previously mentioned, salts of the alkali and alkaline-earth metals have been employed in amounts between about 1 and about 20 pounds per barrel of drilling fluid to reduce the hydration of clays and shales which are encountered during the drilling operation. Typical of such are sodium chloride, calcium chloride, gypsum, calcium acetate, etc. These materials can also be employed in the drilling fluids of my invention to increase their hydration inhibition. The aforementioned class of nonionic surface active agents when employed in accordance with my invention are highly effective as the sole hydration inhibitor.

The nonionic surface active agents which I have found to be effective in substantially eliminating hydration of clays and heaving shales belong to a class of chemicals having the following general formula:

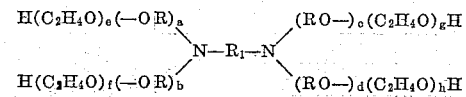

wherein:
$R_1$ is an alkylene radical having 2 to 5 carbon atoms;
$R$ is an alkylene radical having 3 to 5 carbon atoms;
$a$, $b$, $c$, $d$, $e$, $f$, $g$ and $h$ are whole numbers;

the total weight of the hydropholic base of said agent comprising said alkylene diamine and said —OR— groups is between about 2000 and about 3600 units; and the weight content of the polyoxyethylene groups is 30 to 69 percent of the weight of said hydrophobic base.

These agents I have found to be effective in preventing hydration of hydratable clays, heaving shales, etc., in concentrations between about 2 and about 10 pounds per barrel, preferably between about 4 and about 7 pounds per barrel.

These materials are prepared by the addition of a $C_3$ to $C_5$ alkylene oxide to an alkylene diamine under conditions to add two polyoxyalkylene groups to each of the nitrogen groups in the presence of an alkaline catalyst so as to polymerize the oxyalkylene groups into the desired long chain polyoxyalkylene radicals. After the desired addition and polymerization of the $C_3$ to $C_5$ alkylene oxide group has been completed, ethylene oxide is introduced and caused to add to the polyoxyalkylene groups to impart the desired hydrophilic characteristics to the compound. The preparation of these materials from commercially available alkylene diamines and alkylene oxides is known in the art. A surface active agent suitable for use in my invention is available from the Wyandotte Chemicals Corporation under the designation Tetronic 704. This material is prepared by sequential addition of propylene and ethylene oxides to ethylene diamine and has a hydrophobic base weight between about 2000 and 3600 and has a polyoxyethylene content between about 30 and 69 weight percent of said hydroprobic base.

In general, the agents are prepared by mixing the $C_3$ to $C_5$ alkylene oxide with the alkylene diamine at atmospheric or elevated pressures, at temperatures between about 50 and 150° centigrade and in the presence of an alkaline catalyst such as an alkali metal hydroxide or alcoholate. The degree of polymerization or the size of the hydrophobic group is controlled by the relative proportions of $C_3$ to $C_5$ alkylene oxide and alkylene diamine reactants, the alkylene oxide being introduced in a sufficient quantity to obtain a hydrophobic base weight of about 2000 to 3600 units. The system is digested for one to two hours to insure completion of the reaction.

EXAMPLE 1

To determine the hydration inhibiting effect of various non-ionic wetting agent, the following test procedure was employed:

To simulate the aqueous filtrate which seeps into the reservoir during drilling operations, a polyacrylic amide was dissolved in ocean water at a concentration of about 3 pounds per barrel. The surface active agent to be tested was dissolved in this solution at a concentration of about 7 pounds per barrel. A five-gram core of a readily hydratable clay (Costa Rican) was then added to two hundred milliliters of the resultant solution at room temperature and the time for the core to disintegrate was observed. Surface active agents derived from the sequential addition of propylene oxide, then ethylene oxide, to ethylene diamine were tested. The following table summarizes the chemical structure of the agents and the core stability:

Table 1

| Surfactant Sample | Stability of core time to disintegrate, min. | Hydrophobic Base Weight | Polyoxyehtylene Content [1] |
|---|---|---|---|
| 1 | 5 | 500–1,000 | 40–49 |
| 2 | 5 | 1,500–2,000 | 40–49 |
| 3 | 5 | 2,500–3,000 | 0–9 |
| 4 | 5 | 2,500–3,000 | 20–29 |
| 5 | 1,400 | 2,500–3,000 | 40–49 |
| 6 | 5 | 2,500–3,000 | 70–79 |
| 7 | 5 | 3,600–4,500 | 40–49 |
| 8 | 5 | 3,600–4,500 | 80–89 |
| None | 5 | | |

[1] Expressed as percent of the hydrophobic base weight.

From the preceding, it can be seen that the proper balance between the hydrophobic base and the hydrophilic polyoxyethylene groups is essential in my invention. Thus a comparison of the result of sample 5 with those of samples 3, 4 and 6 demonstrates that the polyoxyethylene content must be 30 to 69 percent of the hydrophobic base weight. The weight of the hydrophobic base also greatly affects the hydration inhibiting characteristic of the additives. A comparison of the result from sample 5 with those of samples 1, 2, 7 and 8 shows that the hydrophobic base weight should be between about 2000 and 3600 units. The surfactant employed in sample 5 is commercially available as Tetronic 704.

The following composition of drilling fluids are illustrative of my invention.

FRESH WATER FLUID
[75 lbs. per cubic foot]

| Component: | Parts by weight |
|---|---|
| Native Californian clay (Rodger's Lake) | 114 |
| Water | 300 |
| Bentonite | 10 |
| Quebracho | 0.5 |
| Sodium salt of polyacrylic acid (Cypan [1]) | 0.3 |
| Tetronic 704 | 7.0 |
| | 431.8 |

[1] American Cyanamid Company.

OCEAN WATER FLUID
[77 lbs. per cubic foot]

| Component: | Parts by weight |
|---|---|
| Sodium hydroxide | 2 |
| Native Californian clay (Rodger's Lake) | 100 |
| Ocean water | 307 |
| Attapulgite | 8 |
| Ferro chrome lignosulfonate (Q-Broxin [1]) | 6 |
| Sodium carboxymethyl cellulose | 4 |
| Tetronic 704 | 6 |
| | 433 |

[1] Baroid Mud Company.

WEIGHTED OCEAN WATER MUD
[131 lbs. per cubic ft.]

| Component: | Parts by weight |
|---|---|
| Ocean water | 350 |
| Native Californian clay (Rodger's Lake) | 100 |
| Attapulgite clay | 8 |
| Starch | 5 |
| Ferro chrome lignosulfonate (Q-Broxin) | 6 |
| Sodium hydroxide | 2 |
| Barites | 500 |
| Tetronic 704 | 6 |
| | 977 |

GYPSUM FLUID
[117 lbs. per cubic foot]

| Component: | Parts by weight |
|---|---|
| Attapulgite | 6.2 |
| Fresh water | 272 |
| Ferro chrome lignosulfonate (Q-Broxin) | 3.1 |
| Native Californian clay (Rodger's Lake) | 58 |
| Cypan | 1.5 |
| Sodium hydroxide | 1.5 |
| Barites | 310 |
| Gypsum | 7 |
| Tetronic 704 | 5.4 |
| | 663.2 |

In lieu of the Tetronic 704 product having a hydrophobic base derived from ethylene diamine and propylene oxide, it is of course apparent that other agents having similar bases can be used. Examples of such are the bases prepared from trimethylene diamine and butylene oxide or propylene oxide; from butylene diamine or tetramethylene diamine with propylene oxide, butylene oxide or amylene oxide. It is important however that hydrophobic bases be chosen having a weight between about 2000 and 3600 units.

The preceding examples are presented solely to illustrate compositions of my invention and to set forth the properties which can be obtained by these fluids. They are not to be construed as unduly limiting of my invention which comprises the compositions of materials or their obvious equivalents as set forth in the following claims.

I claim:

1. A drilling fluid comprising an aqueous suspension of a clay and between about 2 and about 10 pounds per barrel of a clay hydration inhibiting agent, said agent having the general formula:

$$\begin{array}{c} H(C_2H_4O)_e(-OR)_a \\ H(C_2H_4O)_f(-OR)_b \end{array} N-R_1-N \begin{array}{c} (-OR)_c(OC_2H_4)_gH \\ (-OR)_d(OC_2H_4)_hH \end{array}$$

wherein
   $R_1$ is an alkylene radical having 2 to 5 carbon atoms;
   R is an alkylene radical having 3 to 5 carbon atoms;
   $a, b, c, d, e, f, g$ and $h$ are whole numbers;
the total weight of the hydrophobic base comprising said $R_1$ and said —OR— groups is between about 2000 and about 3600 units; and
the weight content of the polyoxyethylene groups is 30 to 69 percent of the weight of said hydrophobic base.

2. The drilling fluid of claim 1 wherein $R_1$ is ethylene and R is propylene.

3. A drilling fluid comprising fresh water, between about 10 to 250 pounds per barrel of clay, between about 1 to 20 pounds per barrel of gypsum, and between 2 to 10 pounds per barrel of a clay hydration inhibiting agent, said agent having the general formula:

$$\begin{array}{c} H(C_2H_4O)_e(-OR)_a \\ H(C_2H_4O)_f(-OR)_b \end{array} N-R_1-N \begin{array}{c} (-OR)_c(OC_2H_4)_gH \\ (-OR)_d(OC_2H_4)_hH \end{array}$$

wherein
   $R_1$ is an alkylene radical having 2 to 5 carbon atoms;
   R is an alkylene radical having 3 to 5 carbon atoms;
   $a, b, c, d, e, f, g$ and $h$ are whole numbers;
the total weight of the hydrophobic base comprising said $R_1$ and said —OR— groups is between about 2000 and about 3600 units; and
the weight content of the polyoxyethylene groups is 30 to 69 percent of the weight of said hydrophobic base.

4. The drilling fluid of claim 3 which also contains between about 0.1 to 15 pounds per barrel of a thinning agent.

5. The drilling fluid of claim 3 which also contains between about 0.1 to 15 pounds per barrel of a fluid loss agent.

6. The drilling fluid of claim 3 which also contains between 10 to 600 pounds per barrel of a weighting agent.

7. An ocean water drilling fluid comprising ocean water and between about 10 to 250 pounds per barrel of clay and between about 2 to 10 pounds per barrel of a clay hydration inhibiting agent, said agent having the general formula:

$$\begin{array}{c} H(C_2H_4O)_e(-OR)_a \\ H(C_2H_4O)_f(-OR)_b \end{array} N-R_1-N \begin{array}{c} (-OR)_c(OC_2H_4)_gH \\ (-OR)_d(OC_2H_4)_hH \end{array}$$

wherein
   $R_1$ is an alkylene radical having 2 to 5 carbon atoms;
   R is an alkylene radical having 3 to 5 carbon atoms;
   $a, b, c, d, e, f, g$ and $h$ are whole numbers;
the total weight of the hydrophobic base comprising said $R_1$ and said —OR— groups is between about 2000 and about 3600 units; and
the weight content of the polyoxyethylene groups is 30 to 69 percent of the weight of said hydrophobic base.

8. The drilling fluid of claim 7 which also contains between about 0.1 to 15 pounds per barrel of a thinning agent.

9. The drilling fluid of claim 7 which also contains between about 0.1 to 15 pounds per barrel of a fluid loss agent.

10. The drilling fluid of claim 7 which also contains between 10 to 600 pounds per barrel of a weighting agent.

11. A drilling fluid comprising water, clay, a thinning agent, a fluid loss agent, oil emulsified as the discontinuous phase and a shalt hydration inhibiting agent, said clay being present in an amount between about 10 and 250 pounds per barrel, the thinning agent and fluid loss agent each being present in an amount between about 0.1 and 15 pounds per barrel, and said clay hydration inhibiting agent being present in an amount between about 2 and 10 pounds per barrel, said agent having the general formula:

$$\begin{array}{c} H(C_2H_4O)_e(-OR)_a \\ H(C_2H_4O)_f(-OR)_b \end{array} N-R_1-N \begin{array}{c} (-OR)_c(OC_2H_4)_gH \\ (-OR)_d(OC_2H_4)_hH \end{array}$$

wherein
   $R_1$ is an alkylene radical having 2 to 5 carbon atoms;
   R is an alkylene radical having 3 to 5 carbon atoms;
   $a, b, c, d, e, f, g$ and $h$ are whole numbers;
the total weight of the hydrophobic base comprising said $R_1$ and said —OR— groups is between about 2000 and about 3600 units; and
the weight content of the polyoxyethylene groups is 30 to 69 percent of the weight of said hydrophobic base.

References Cited in the file of this patent

UNITED STATES PATENTS

| | | |
|---|---|---|
| 2,882,171 | Denman | Apr. 14, 1959 |
| 2,935,473 | King et al. | May 3, 1960 |
| 2,979,528 | Lundsted | Apr. 11, 1961 |

FOREIGN PATENTS

| | | |
|---|---|---|
| 803,544 | Great Britain | Oct. 29, 1958 |
| 576,739 | Canada | May 26, 1959 |

OTHER REFERENCES

Burdyn et al.: "That New Drilling Fluid for Hot Holes," article in the Oil and Gas Journal, September 10, 1956, pages 104–107.